United States Patent
Fujii

(10) Patent No.: US 12,228,475 B2
(45) Date of Patent: Feb. 18, 2025

(54) VIBRO-ACOUSTIC ANALYSIS METHOD AND DEVICE AND EQUIPMENT-ABNORMALITY-LOCATION ESTIMATION METHOD AND DEVICE

(71) Applicants: MITSUI E&S DU CO., LTD., Aioi (JP); NIPPON KAIJI KYOKAI, Tokyo (JP); NSK LTD., Tokyo (JP)

(72) Inventor: Takashi Fujii, Aioi (JP)

(73) Assignees: MITSUI E&S DU CO., LTD., Aioi (JP); NIPPON KAIJI KYOKAI, Tokyo (JP); NSK LTD., Tokyo (JP)

( * ) Notice: Subject to any disclaimer, the term of this patent is extended or adjusted under 35 U.S.C. 154(b) by 65 days.

(21) Appl. No.: 17/480,489

(22) Filed: Sep. 21, 2021

(65) Prior Publication Data

US 2022/0003630 A1 Jan. 6, 2022

Related U.S. Application Data

(63) Continuation of application No. PCT/JP2019/015200, filed on Apr. 5, 2019.

(51) Int. Cl.
*G01M 7/02* (2006.01)

(52) U.S. Cl.
CPC .................. *G01M 7/025* (2013.01)

(58) Field of Classification Search
None
See application file for complete search history.

(56) References Cited

U.S. PATENT DOCUMENTS

| | | | | |
|---|---|---|---|---|
| 2015/0363925 A1* | 12/2015 | Shibuya | .......... | G06V 10/761 345/440 |
| 2016/0076970 A1* | 3/2016 | Takahashi | .......... | G06N 20/00 702/33 |
| 2019/0037840 A1 | 12/2019 | Koizumi et al. | | |

FOREIGN PATENT DOCUMENTS

| | | | |
|---|---|---|---|
| CN | 102831325 A | * | 12/2012 |
| CN | 10511559 A | | 12/2015 |

(Continued)

OTHER PUBLICATIONS

Wangpeng He, Yanyang Zi, Binqiang Chen, Feng Wu a,b, Automatic fault feature extraction of mechanical anomaly on induction motor bearing using ensemble super-wavelet transform, Mechanical Systems and Signal Processing, vols. 54-55, 2015, pp. 457-480, (Year: 2015).*

(Continued)

*Primary Examiner* — Matthew G Marini
(74) *Attorney, Agent, or Firm* — Oblon, McClelland, Maier & Neustadt, L.L.P.

(57) ABSTRACT

In feature value extraction processing step, feature values are extracted from time-series vibroacoustic data in equipment in operation. In machine learning diagnosis step, accumulated are feature values corresponding to normal equipment-operation-state and general measurement data on equipment. Probability distribution model related to correlation between general measurement data and feature values corresponding to normal equipment-operation-state and constructed through machine learning is fed with general-measurement data and feature values extracted in feature value extraction processing step to calculate degree of anomaly based on probability distribution model. In anomalous location estimation step, precalculated damaged-case dataset of degrees of anomaly is compared with actual-measurement dataset of degrees of anomaly calculated from (Continued)

general-measurement data in equipment to obtain degree of similarity for each location in the equipment and output the locations, in order ranked by degrees of similarity for each location in equipment, as locations having high likelihoods of being damaged.

4 Claims, 5 Drawing Sheets

(56) References Cited

FOREIGN PATENT DOCUMENTS

| | | | | |
|---|---|---|---|---|
| JP | 9-305224 A | 11/1997 | | |
| JP | 2010-48684 A | 3/2010 | | |
| JP | 5538597 B2 * | 7/2014 | ........... | G05B 23/024 |
| JP | 2019-27814 A | 2/2019 | | |
| WO | WO 2018/150616 A1 | 8/2018 | | |

OTHER PUBLICATIONS

Machine translation of JP 5538597B2 (Year: 2014).*
International Search Report issued Jun. 18, 2019 in PCT/JP2019/015200, filed on Apr. 5, 2019, 1 page.

* cited by examiner

VIBRO-ACOUSTIC ANALYSIS METHOD AND DEVICE AND EQUIPMENT-ABNORMALITY-LOCATION ESTIMATION METHOD AND DEVICE

TECHNICAL FIELD

The present disclosure relates to a method and an apparatus for vibroacoustic analysis and a method and an apparatus for estimation of an anomalous location in equipment.

BACKGROUND ART

For equipment including an engine or other rotating body, vibrations or acoustics that have skewness are measured to acquire time-series data.

Often employed for analysis of the time-series data is spectral analysis using a Fourier transform or the like. Simple spectral analysis may result in loss of information on a time domain. In addition, it tends to be difficult for simple spectral analysis to deliver a proper spectral analysis when measured data includes a wide distribution of frequencies.

An alternative approach employing a wavelet transform has been proposed. With the wavelet transform, information on a time domain, which would be lost if the Fourier transform is used to obtain a frequency characteristic, can remain and analysis is performed with data decomposed into the time domain and a frequency domain.

For example, Patent Literature 1 represents a general technical standard relating to approaches employing the wavelet transform.

CITATION LIST

Patent Literature

Patent Literature 1: JP 2010-48684A

SUMMARY

Technical Problems

However, in equipment with an engine or other rotating body, an inappropriate analysis result may be presented because such equipment is composed of a large number of components such as a bearing unit, a gear unit and a power generation unit, and information from the units is mixed into measured vibroacoustic data. Furthermore, depending on a use situation, an output of the equipment is increased/decreased and an amplitude of vibroacoustics therein widely varies; therefore, in terms of accuracy, it is considered inappropriate to estimate an anomalous location merely based on a size of vibroacoustic data measured.

For reference, in vibroacoustic data for a relatively low-speed bearing or the like with a rotation speed of the order of several hundred $min^{-1}$, a large component often appears in a high-frequency band of several to several ten kHz. This is because surroundings of the bearing unit vibrate at natural frequencies thereof due to a pulsed vibration source, and a vibroacoustic signal attributable to a flaw or the like tends to be composed mainly of a high-frequency wave component. Therefore, spectral analysis of a measurement signal may not necessarily enable appropriate extraction of a peak frequency and an amplitude in a low-frequency region around the rotation speed. To address this, for example, the peak frequency and the amplitude in the low-frequency region are generally extracted through spectral analysis following envelope processing using a low-pass filter or the like. This approach is suitable for analysis of a low-frequency region; however, signals in a high-frequency region cannot be analyzed. In addition, depending on performance and characteristics of the low-pass filter, the peak frequency and the amplitude may not necessarily be correct values and thus may be difficult to use for assessment.

Studies undertaken by the inventor of the present disclosure and others to solve the above disadvantages have led to the following findings. That is, a wavelet transform can be used to decompose measured time-series data into a plurality of vectors that represent time domains and frequency domains; then, spectral analysis is performed on respective time-series vectors corresponding to frequency bands, thereby properly extracting peak frequencies and amplitudes in a wide range from a low-frequency region to a high-frequency region.

However, a stream of time-series data is decomposed into a large number of streams of time-series data by analysis using a wavelet transform; therefore, manpower assessment on a result of this analysis needs a large amount of labor and is not considered feasible.

The present disclosure has been made in consideration of the above conventional disadvantages and has its object to provide a method and an apparatus for vibroacoustic analysis and a method and an apparatus for estimation of an anomalous location in equipment that are capable of: using a wavelet transform to, with high accuracy and with ease, analyze vibroacoustic data that has skewness and estimate an anomalous location in equipment; and thus preventing occurrence of secondary damages through early detection of the anomalous location as well as implementing planned maintenance based on residual life prediction.

Solution to Problems

In order to accomplish the above object, a method for vibroacoustic analysis according to the disclosure includes:
  a feature value extraction processing step for extracting feature values from time-series vibroacoustic data measured in equipment in operation; and
  a machine learning diagnosis step for accumulating the feature values extracted in the feature value extraction processing step and corresponding to a state in which the equipment operates normally and general measurement data on the equipment, constructing through machine learning a probability distribution model related to a correlation between the feature values corresponding to the state in which the equipment operates normally and the general measurement data, feeding the probability distribution model with the general measurement data on the equipment and with the feature values extracted in the feature value extraction processing step and calculating a degree of anomaly based on the probability distribution model.

In the method for vibroacoustic analysis, the feature value extraction processing step may include:
  a basic feature value extraction processing step for extracting an effective value, a peak value, a largest peak difference, skewness, kurtosis, an average crest factor and an absolute average amplitude as feature values from measured acceleration in the time-series vibroacoustic data measured in the equipment in operation;
  a spectral analysis feature value extraction processing step for performing spectral analysis on the time-series data to extract an order and a peak value of a maximum peak, an order and a peak value of a second peak, an order and a peak value of a third peak, an order and a peak value of a fourth peak, . . . and an order and a peak value of an n-th peak as feature values for the data obtained;

a continuous wavelet transform processing step for performing a wavelet transform on the time-series data to decompose the time-series data into scale levels corresponding to a plurality of frequency bands and obtain power time-series data for each of the scale levels;

a wavelet transform feature value extraction processing step for extracting an effective value, a largest value, a highest crest factor and an absolute average value as feature values for each of the frequency bands from the power time-series data obtained for each of the scale levels in the continuous wavelet transform processing step; and a wavelet transform spectral analysis feature value extraction processing step for performing spectral analysis on the power time-series data obtained for each of the scale levels in the continuous wavelet transform processing step to extract an order and a peak value of a maximum peak, an order and a peak value of a second peak, an order and a peak value of a third peak, an order and a peak value of a fourth peak, . . . and an order and a peak value of an n-th peak as feature values for the data obtained.

In the method for vibroacoustic analysis, the general measurement data on the equipment may include at least one selected from a group consisting of rotation number, output, workload, pressure, temperature and speed.

An apparatus for vibroacoustic analysis according to the disclosure may include:

a feature value extraction processing unit configured to extract feature values from time-series vibroacoustic data measured in equipment in operation; and a machine learning diagnosis unit configured to accumulate feature values extracted by the feature value extraction processing unit and corresponding to a state in which the equipment operates normally and general measurement data on the equipment, construct through machine learning a probability distribution model related to a correlation between the feature values corresponding to a state in which the equipment operates normally and the general measurement data, feed the probability distribution model with the general measurement data on the equipment and with the feature values extracted by the feature value extraction processing unit and calculate a degree of anomaly based on the probability distribution model.

In the apparatus for vibroacoustic analysis, the feature value extraction processing unit may include:

a basic feature value extraction processing unit configured to extract an effective value, a peak value, a largest peak difference, skewness, kurtosis, an average crest factor and an absolute average amplitude as feature values from measured acceleration in time-series vibroacoustic data measured in the equipment in operation;

a spectral analysis feature value extraction processing unit configured to perform spectral analysis on the time-series data to extract an order and a peak value of a maximum peak, an order and a peak value of a second peak, an order and a peak value of a third peak, an order and a peak value of a fourth peak, . . . and an order and a peak value of an n-th peak as feature values for the data obtained;

a continuous wavelet transform processing unit configured to perform a wavelet transform on the time-series data and decompose the time-series data into scale levels corresponding to a plurality of frequency bands to thereby obtain power time-series data for each of the scale levels;

a wavelet transform feature value extraction processing unit configured to extract an effective value, a largest value, a highest crest factor and an absolute average value as feature values for each of the frequency bands, from the power time-series data obtained for each of the scale levels by the continuous wavelet transform processing unit; and a wavelet transform spectral analysis feature value extraction processing unit configured to perform spectral analysis on the power time-series data obtained for each of the scale levels by the continuous wavelet transform processing unit to extract an order and a peak value of a maximum peak, an order and a peak value of a second peak, an order and a peak value of a third peak, an order and a peak value of a fourth peak, . . . and an order and a peak value of an n-th peak as feature values for the data obtained.

In the apparatus for vibroacoustic analysis, the general measurement data on the equipment may include at least one selected from a group consisting of rotation number, output, workload, pressure, temperature and speed.

The disclosure may also be configured as a method for estimation of an anomalous location in equipment that includes:

in the machine learning diagnosis step in the method for vibroacoustic analysis, precalculating damaged-case dataset of degrees of anomaly for each location in the equipment that correspond to cases where the location is damaged; and an anomalous location estimation step for comparing the damaged-case dataset precalculated in the machine learning diagnosis step with actual measurement dataset of degrees of anomaly calculated from general measurement data on the equipment to obtain a degree of similarity for each location in the equipment and output the locations, in order ranked by the degrees of similarity for each location in the equipment, as locations having high likelihoods of being damaged.

The disclosure may be also configured as an apparatus for estimation of an anomalous location in equipment in which:

the machine learning diagnosis unit in the apparatus for vibroacoustic analysis is configured to precalculate damaged-case dataset of degrees of anomaly for each location in the equipment that correspond to cases where the location is damaged; and the apparatus includes an anomalous location estimation unit configured to compare the damaged-case dataset precalculated by the machine learning diagnosis unit with actual measurement dataset of degrees of anomaly calculated from general measurement data on the equipment to obtain a degree of similarity for each location in the equipment and thus output the locations, in order ranked by the degrees of similarity for each location in the equipment, as locations having high likelihoods of being damaged.

Effects

The method and the apparatus for vibroacoustic analysis and the method and the apparatus for estimation of the anomalous location in the equipment according to the disclosure are enabled to produce excellent effects of: using a wavelet transform to, with high accuracy and with ease, analyze vibroacoustic data and estimate an anomalous location in the equipment; and thus preventing occurrence of secondary damages through early detection of the anomalous location as well as implementing planned maintenance based on residual life prediction.

DESCRIPTION OF EMBODIMENT

An embodiment in the disclosure will be described in conjunction with attached drawings.

FIGS. 1-5 illustrate an embodiment of a method and an apparatus for vibroacoustic analysis and a method and an apparatus for estimation of an anomalous location in equipment according to the disclosure.

Figure 1:
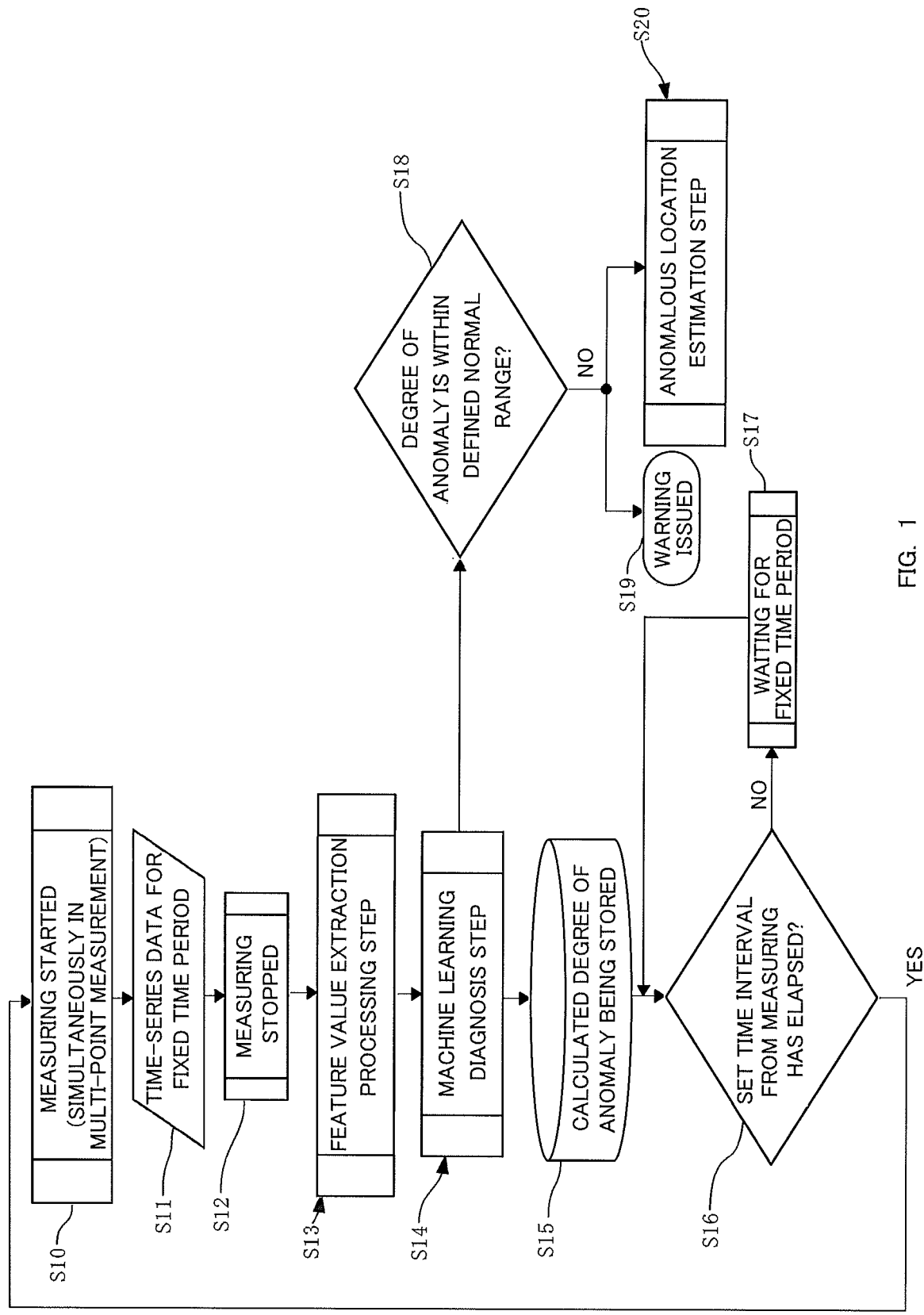
FIG. 1 is a flowchart showing an embodiment of a method and an apparatus for vibroacoustic analysis and a method and an apparatus for estimation of an anomalous location in equipment according to the disclosure.

The method for vibroacoustic analysis in the embodiment includes a feature value extraction processing step (see Step S13) and a machine learning diagnosis step (see Step S14) as illustrated in FIG. 1.

The feature value extraction processing step includes extracting feature values from time-series vibroacoustic data measured in equipment in operation.

The machine learning diagnosis step includes: accumulating feature values extracted in the feature value extraction processing step and corresponding to a state in which the equipment operates normally and general measurement data (on, for example, rotation number, output, workload, pressure, temperature or speed) on the equipment; constructing through machine learning a probability distribution model related to a correlation between the general measurement data and the feature values corresponding to the state in which the equipment operates normally; feeding the probability distribution model with the general measurement data on the equipment and with the feature values extracted in the feature value extraction processing step; and calculating a degree of anomaly based on the probability distribution model.

In the example in FIG. 1, measuring is started as Step S10. In the case of measurement in multiple locations, the measuring is performed simultaneously. Time-series data for a fixed time period is inputted as Step S11, and the measuring is stopped as Step S12.

Thereafter, a feature value extraction processing step and a machine learning diagnosis step are performed as Steps S13 and S14, respectively.

The degree of anomaly calculated in the machine learning diagnosis step is stored and accumulated as Step S15.

After the degree of anomaly is stored and accumulated in Step S15, whether a set time interval from the measuring has elapsed or not is determined as Step S16. If not elapsed, the procedure returns to Step S16 after waiting for a fixed time period as Step S17. If elapsed, the procedure returns to Step S10 and the measuring is repeated.

The degree of anomaly calculated in the machine learning diagnosis step in Step S14 is compared with regard to a defined normal range as Step S18. If the degree of anomaly is not within the normal range, an alarm is issued as Step S19 and an anomalous location estimation step is performed as Step S20. The anomalous location estimation step is configured as a step performed in the method for estimation of the anomalous location in the equipment.

Figure 2:
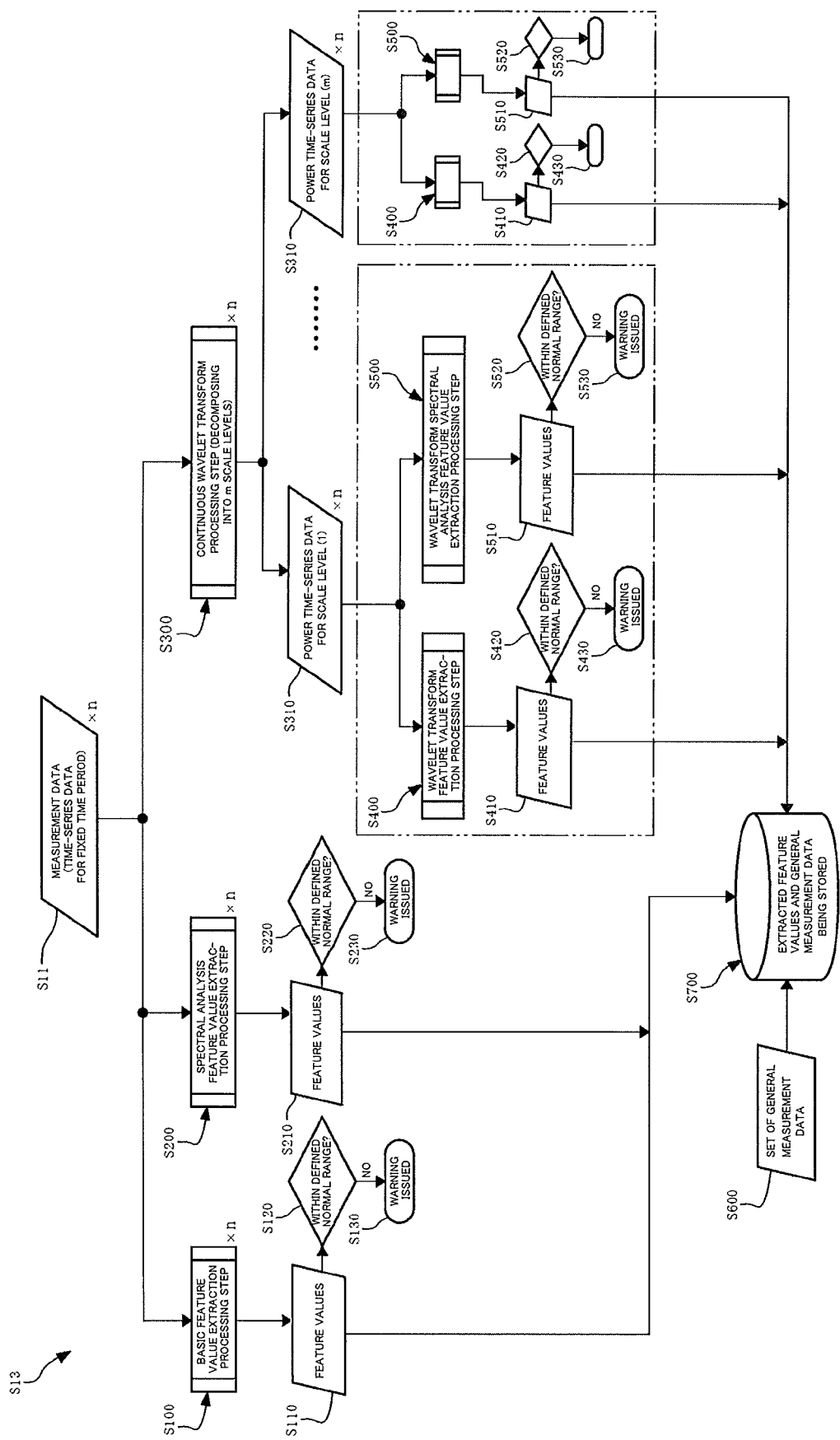
FIG. 2 is a flowchart showing details in feature value extraction processing in the embodiment in the method and the apparatus for vibroacoustic analysis and the method and the apparatus for estimation of the anomalous location in the equipment according to the disclosure.

In detail, the feature value extraction processing step uses the time-series data for the fixed time period inputted as the measurement data in Step S11 and, as illustrated in FIG. 2, includes: a basic feature value extraction processing step as Step S100; a spectral analysis feature value extraction processing step as Step S200; a continuous wavelet transform processing step as Step S300; a wavelet transform feature value extraction processing step as Step S400; and a wavelet transform spectral analysis feature value extraction processing step as Step S500.

For reference, when a number of locations subject to measurement in the equipment is n, a number of pieces of the time-series data for the fixed time period inputted as the measurement data in Step S11 is n corresponding to the number of locations subject to measurement in the equipment.

The basic feature value extraction processing step includes extracting as feature values, from measured acceleration in the time-series vibroacoustic data measured in the equipment in operation (see Step S110): an effective value MP1

$$MP1 = \sqrt{\frac{\sum_{i=1}^{n} x_i^2}{n}} ; \qquad (EQ. 1)$$

an average peak value MP2

$$MP2 = \frac{\sum_{i_p=1}^{n_p} |x_{i_p}|}{n_p} \qquad (EQ. 2)$$

(where a peak is either a local maximum value or a local minimum value);

a largest peak difference MP3

$$MP3 = x_{+p} - x_{-p} \qquad (EQ. 3)$$

(where $x_{+p}$ and $x_{-p}$ are largest and smallest values for a sampling period, respectively);

skewness MP4

$$MP4 = \frac{\sum_{i=0}^{n}(x_i - \bar{x})^3}{(n-1)\sigma^3} \qquad (EQ.\ 4)$$

where $\sigma$ is a standard deviation $$\sigma = \sqrt{\frac{1}{n-1}\sum_{i=1}^{n}(x_i - \bar{x})^2}\ ; \qquad (EQ.\ 5)$$

kurtosis MP5

$$MP5 = \frac{\sum_{i=0}^{n}(x_i - \bar{x})^4}{(n-1)\sigma^4}; \qquad (EQ.\ 6)$$

an average crest factor MP6

$$MP6 = \frac{MP2}{MP1} \qquad (EQ.\ 7)$$

(where crest factor=peak value/effective value, the peak value used being the average peak value MP2); and an absolute average amplitude MP7

$$MP7 = \frac{\sum_{i=1}^{n}|x_i - \bar{x}|}{n}. \qquad (EQ.\ 8)$$

In the basic feature value extraction processing step as Step S100, each of the feature values extracted in Step S110 is compared with a defined normal range as Step S120, and, if the feature value is not within the normal range, an alarm is issued as Step S130.

The spectral analysis feature value extraction processing step includes performing spectral analysis on the time-series data to extract an order and a peak value of a maximum peak, an order and a peak value of a second peak, an order and a peak value of a third peak, an order and a peak value of a fourth peak, . . . and an order and a peak value of an n-th peak as feature values for the data obtained (see Step S210). In the spectral analysis feature value extraction processing step as Step S200, each of the feature values extracted in Step S210 is compared with regard to the defined normal range in Step S220. If the feature value is not within the normal range, an alarm is issued in Step S230.

The continuous wavelet transform processing step includes performing a wavelet transform on the time-series data to decompose the same into scale levels corresponding to a plurality of (for example, m) frequency bands and thus obtaining power time-series data for each of the scale levels (see Step S310).

The wavelet transform feature value extraction processing step includes extracting as feature values for each of the frequency bands, from the power time-series data obtained for each of the scale levels in the continuous wavelet transform processing step (see Step S410), an effective value WP1

$$WP1 = \sqrt{\frac{\sum_{i=1}^{n}x_i^2}{n}}\ ; \qquad (EQ.\ 9)$$

a largest value WP2

$$WP2 = \max(x_i) \qquad (EQ.\ 10);$$

a highest crest factor WP3

$$WP3 = \frac{WP2}{WP1}; \qquad (EQ.\ 11)$$

and an absolute average value WP4

$$WP4 = \frac{\sum_{i=1}^{n}|x_i - \bar{x}|}{n}. \qquad (EQ.\ 12)$$

In the wavelet transform feature value extraction processing step as Step S400, each of the feature values extracted in Step S410 is compared with regard to a defined normal range as Step S420. If the feature value is not within the normal range, an alarm is issued in Step S430.

The wavelet transform spectral analysis feature value extraction processing step includes performing spectral analysis on the power time-series data obtained for each of the scale levels in the continuous wavelet transform processing step to extract an order and a peak value of a maximum peak, an order and a peak value of a second peak, an order and a peak value of a third peak, an order and a peak value of a fourth peak, . . . and an order and a peak value of an n-th peak as feature values for the data obtained (see Step S510). In the wavelet transform spectral analysis feature value extraction processing step as Step S500, each of the feature values extracted in the feature value Step S510 is compared with regard to a defined normal range in Step S520. If the feature value is not within the normal range, an alarm is issued in Step S530.

Stored and accumulated as Step S700 are the feature values extracted in the basic feature value extraction processing step (see Step S110), the feature values extracted in the spectral analysis feature value extraction processing step (see Step S210), the feature values extracted in the wavelet transform feature value extraction processing step (see Step S410), the feature values extracted in the wavelet transform spectral analysis feature value extraction processing step (see Step S510) and the general measurement data (on, for example, rotation number, output, workload, pressure, temperature or speed) measured on the equipment as Step S600.

The anomalous location estimation step includes: comparing damaged-case dataset precalculated in the machine learning diagnosis step and actual measurement dataset of degrees of anomaly calculated from general measurement data on the equipment to obtain a degree of similarity for each location in the equipment; and outputting the locations, in order ranked by the degrees of similarity for the respective locations in the equipment, as locations having high likelihoods of being damaged.

Figure 3:
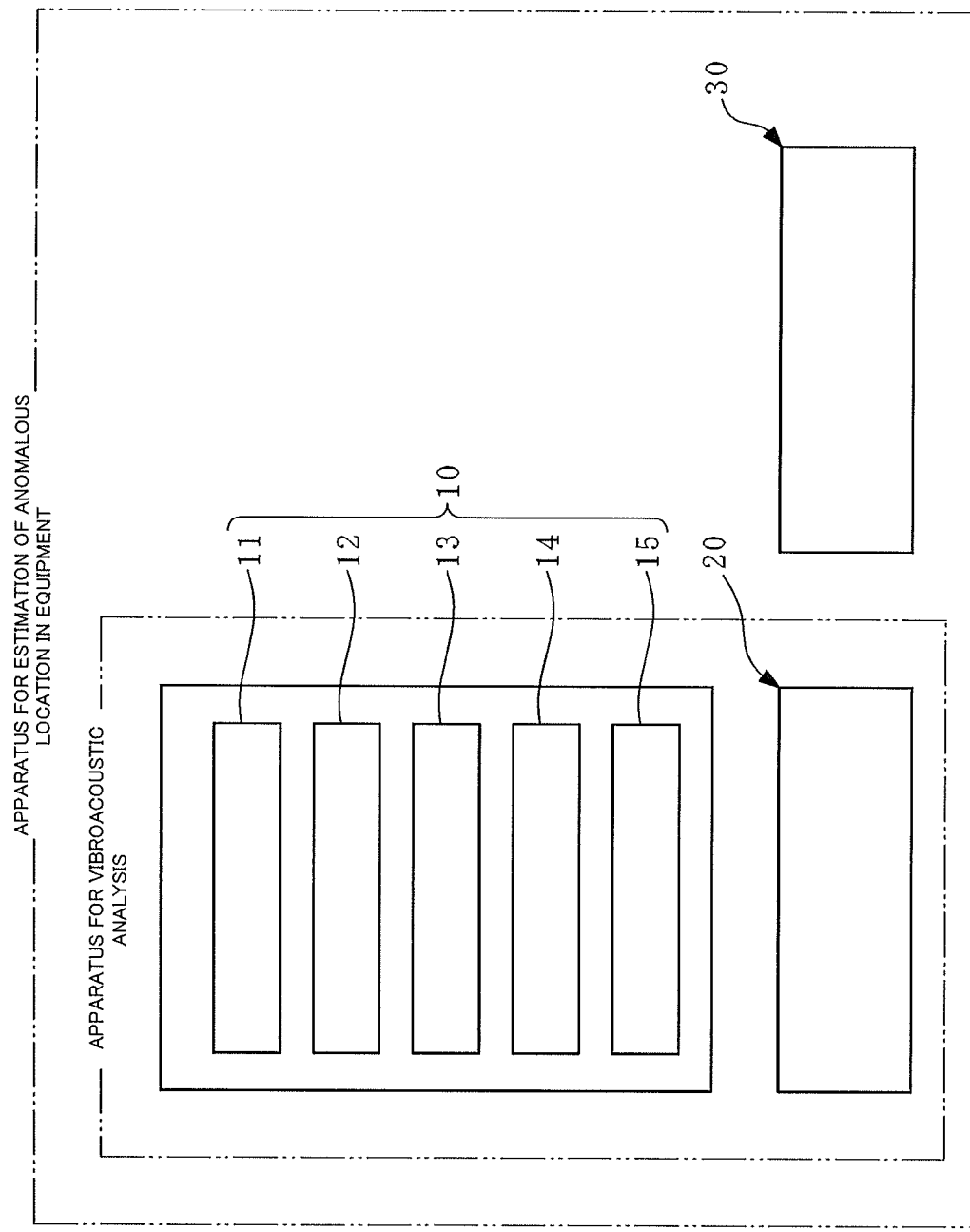
FIG. 3 is a block diagram in the embodiment in the method and the apparatus for vibroacoustic analysis and the method and the apparatus for estimation of the anomalous location in the equipment according to the disclosure.

FIG. 3 is a block diagram for the embodiment. A feature value extraction processing unit 10 and a machine learning diagnosis unit 20 are provided as an apparatus for vibroacoustic analysis. The feature value extraction processing unit 10 and the machine learning diagnosis unit 20 in the apparatus for vibroacoustic analysis and an anomalous location estimation unit 30 are provided as an apparatus for extraction of an anomalous location in equipment.

The feature value extraction processing unit 10 is configured to extract feature values from time-series vibroacoustic data measured in the equipment in operation.

The machine learning diagnosis unit 20 is configured to: accumulate feature values extracted by the feature value extraction processing unit 10 and corresponding to a state in which the equipment operates normally and general measurement data on the equipment; construct through machine learning a probability distribution model related to a correlation between the general measurement data and the feature values corresponding to the state in which the equipment operates normally; feed the probability distribution model with the general measurement data on the equipment and with the feature values extracted by the feature value extraction processing unit 10; and calculate a degree of anomaly based on the probability distribution model.

The feature value extraction processing unit 10 includes a basic feature value extraction processing unit 11, a spectral analysis feature value extraction processing unit 12, a continuous wavelet transform processing unit 13, a wavelet transform feature value extraction processing unit 14 and a wavelet transform spectral analysis feature value extraction processing unit 15.

The basic feature value extraction processing unit 11 is configured to extract an effective value, a peak value, a largest peak difference, skewness, kurtosis, an average crest factor and an absolute average amplitude as feature values from measured acceleration in time-series vibroacoustic data measured in the equipment in operation.

The spectral analysis feature value extraction processing unit 12 is configured to perform spectral analysis on the time-series data to extract an order and a peak value of a maximum peak, an order and a peak value of a second peak, an order and a peak value of a third peak, an order and a peak value of a fourth peak, . . . and an order and a peak value of an n-th peak as feature values for the data obtained.

The continuous wavelet transform processing unit 13 is configured to perform a wavelet transform on the time-series data to decompose the same into scale levels corresponding to a plurality of frequency bands and thus obtain power time-series data for each of the scale levels.

The wavelet transform feature value extraction processing unit 14 is configured to extract an effective value, a largest value, a highest crest factor and an absolute average value as feature values for each of the frequency bands, from the power time-series data obtained for each of the scale levels by the continuous wavelet transform processing unit 13.

The wavelet transform spectral analysis feature value extraction processing unit 15 is configured to perform spectral analysis on the power time-series data obtained for each of the scale levels by the continuous wavelet transform processing unit 13 to extract an order and a peak value of a maximum peak, an order and a peak value of a second peak, an order and a peak value of a third peak, an order and a peak value of a fourth peak, . . . and an order and a peak value of an n-th peak as feature values for the data obtained.

The anomalous location estimation unit 30 is configured to compare the damaged-case dataset precalculated by the machine learning diagnosis unit 20 with actual measurement dataset of degrees of anomaly calculated from general measurement data on the equipment to obtain a degree of similarity for each location in the equipment; and output the locations, in order ranked by the degrees of similarity for the respective locations in the equipment, as locations having high likelihoods of being damaged.

Next, an operation of the above embodiment will be described.

In FIG. 1, measuring is started for each location in the equipment (see Step S10), time-series data for a fixed time period is inputted (see Step S11), the feature value extraction processing step is performed (see Step S13) after the measuring is stopped (see Step S12) and the machine learning diagnosis step is subsequently performed (see Step S14).

A degree of anomaly calculated in the machine learning diagnosis step is stored and accumulated (see Step S15). Thereafter, whether a set time interval from the measurement has elapsed or not is determined (see Step S16). If not elapsed, the operation returns to Step S16 after waiting for a fixed time period (see Step S17); if elapsed, the operation returns to Step S10 and the measuring is repeated.

The degree of anomaly calculated in the machine learning diagnosis step is compared with regard to a defined normal range (see Step S18). If the degree of anomaly is not within the normal range, an anomalous location estimation step is performed (see Step S20) while an alarm is issued (see Step S19).

In the feature value extraction processing step, the time-series data for the fixed time period inputted as the measurement data (see Step S11) is utilized and, as illustrated in FIG. 2, performed are the basic feature value extraction processing step (see Step S100), the spectral analysis feature value extraction processing step (see Step S200), the continuous wavelet transform processing step (see Step S300), the wavelet transform feature value extraction processing step (see Step S400) and the wavelet transform spectral analysis feature value extraction processing step (see Step S500).

In the basic feature value extraction processing step, extracted as feature values from measured acceleration in vibroacoustic time-series data measured in the equipment in operation are the effective value MP1 (see EQ. 1), the average peak value MP2 (see EQ. 2), the largest peak difference MP3 (see EQ. 3), the skewness MP4 (see EQ. 4), the kurtosis MP5 (see EQ. 6), the average crest factor MP6 (see EQ. 7) and the absolute average amplitude MP7 (see EQ. 8) (see Step S110). Each of the feature values extracted in the basic feature value extraction processing step is compared with regard to a defined normal range (see Step S120). If the feature value is not within the normal range, an alarm is issued (see Step S130).

In the spectral analysis feature value extraction processing step, performed is spectral analysis on the time-series data to extract an order and a peak value of a maximum peak, an order and a peak value of a second peak, an order and a peak value of a third peak, an order and a peak value of a fourth peak, . . . and an order and a peak value of an n-th peak as feature values for the data obtained (see Step S210). Each of the feature values extracted in the spectral analysis feature value extraction processing step is compared with regard to a defined normal range (see Step S220). If the feature value is not within the normal range, an alarm is issued (see Step S230).

In the continuous wavelet transform processing step, a wavelet transform is performed on the time-series data, whereby the time-series data is decomposed into scale levels corresponding to a plurality of (for example, m) frequency bands to obtain power time-series data for each of the scale levels (see Step S310).

Figure 4:
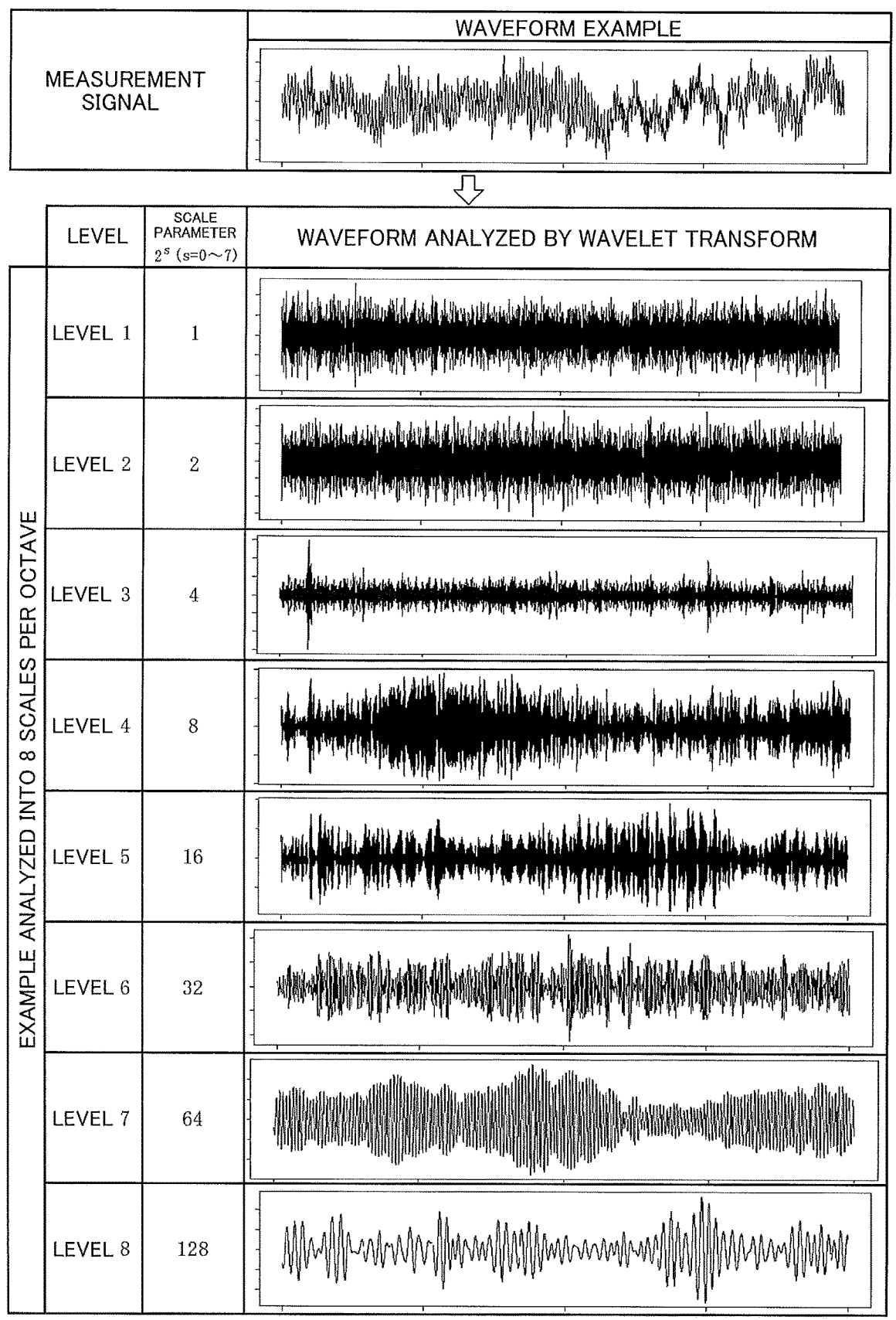
FIG. 4 is a diagram showing a waveform example of a measurement signal and waveform examples analyzed though wavelet transform in the embodiment in the method and the apparatus for vibroacoustic analysis and the method and the apparatus for estimation of the anomalous location in the equipment according to the disclosure.

In the embodiment, the waveform of a measurement signal and waveforms obtained after the analysis using a wavelet transform appear, for example, as illustrated in FIG. 4. In the example in FIG. 4, the data was decomposed with a scale parameter set to 2s (s=0 to 7, which means m=8) per octave, and the analysis was performed up to eight scales per octave. Note that respective ordinates for the waveforms are not the same and have been adjusted properly in accordance with plot widths thereof. A method for the decomposition may be freely selected. A scale parameter smaller than 1 may be also applied when it is desired that further high-frequency components be observed.

In the wavelet transform spectral analysis feature value extraction processing step, extracted as feature values for each of the frequency bands from the power time-series data obtained for each of the scale levels in the continuous wavelet transform processing step are an effective value WP1 (see EQ. 9), a largest value WP2 (see EQ. 10), a highest crest factor WP3 (see EQ. 11) and an absolute average value WP4 (see EQ. 12)(see Step S410). Each of the feature values extracted in the wavelet transform feature value extraction processing step is compared with regard to a defined normal range (see Step S420). If the feature value is not within the normal range, an alarm is issued (see Step S430).

In the wavelet transform spectral analysis feature value extraction processing step, performed is spectral analysis on the power time-series data obtained for each of the scale levels in the continuous wavelet transform processing step are an order and a peak value of a maximum peak, an order and a peak value of a second peak, an order and a peak value of a third peak, an order and a peak value of a fourth peak, . . . and an order and a peak value of an n-th peak as feature values for the data obtained (see Step S510). Each of the feature values extracted in the wavelet transform spectral analysis feature value extraction processing step in Step S500 is compared with regard to a defined normal range (see Step S520). If the feature value is not within the normal range, an alarm is issued (see Step S530).

Stored and accumulated are the feature values extracted in the above basic feature value extraction processing step (see Step S110), the feature values extracted in the spectral analysis feature value extraction processing step (see Step S210), the feature values extracted in the wavelet transform feature value extraction processing step (see Step S410), the feature values extracted in the wavelet transform spectral analysis feature value extraction processing step (see Step S510) and the general measurement data on the equipment such as rotation number, output, workload, pressure, temperature or speed thereof (see Step S600) (see Step S700). While the number of measurement locations in the equipment is n, the general measurement data is provided as a set for the equipment (one unit) to be diagnosed.

In the anomalous location estimation step, damaged-case dataset of degrees of anomaly precalculated in the machine learning diagnosis step is compared with actual measurement dataset of degrees of anomaly calculated from the general measurement data on the equipment to obtain a degree of similarity for each location in the equipment and the locations are outputted, in order ranked by the degrees of similarity, as locations having high likelihoods of being damaged.

Figure 5:
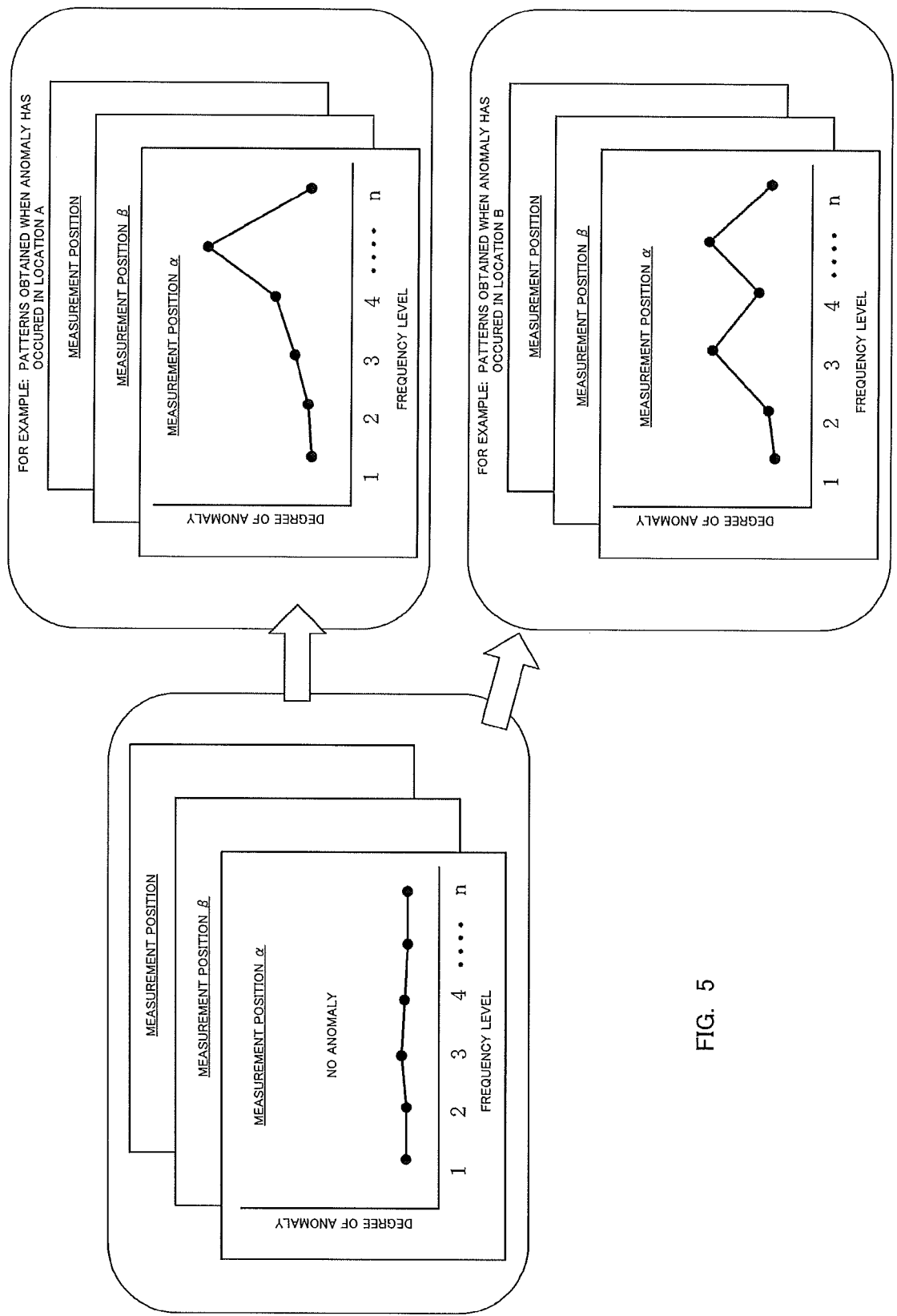
FIG. 5 is a diagram showing patterns obtained when an anomaly has occurred in the embodiment in the method and the apparatus for vibroacoustic analysis and the method and the apparatus for estimation of the anomalous location in the equipment according to the disclosure.

FIG. 5 illustrates charts depicting patterns obtained when an anomaly has occurred in locations in the embodiment. An abscissa of each of the charts illustrated in FIG. 5 represents a frequency level and an ordinate thereof represents a degree of anomaly. Patterns in measurement positions "α", "β" and so on with an anomaly in a location A and an anomaly in a location B, for example, are displayed in comparison with data with no anomaly in any of the locations. Thus, locations having high likelihoods of being damaged can be identified based on the frequency level with a high degree of anomaly.

Thus, the embodiment enables appropriate extraction of peak frequencies and amplitudes in a wide range from a low-frequency region to a high-frequency region by using a wavelet transform to decompose measured time-series data into a plurality of vectors that represent time domains and frequency domains and then performing spectral analysis on respective time-series vectors corresponding to frequency bands.

Moreover, the embodiment eliminates the need for manpower assessment on an analysis result of a large number of streams of time-series data into which one stream of time-series data is decomposed by a wavelet transform, which saves a large amount of labor and makes the assessment feasible.

Thus, using a wavelet transform, analyzation of vibroacoustic data that has skewness and estimation of an anomalous location in equipment can be carried out with high accuracy and with ease; and thus occurrence of secondary damages can be prevented through early detection of anomalous locations and planned maintenance based on residual life prediction can be implemented.

It is to be understood that a method and an apparatus for vibroacoustic analysis and a method and an apparatus for estimation of an anomalous location in equipment according to the disclosure is not limited to the above embodiment and that various changes and modifications may be made without departing from the scope of the disclosure.

REFERENCE SIGNS LIST 10 feature value extraction processing unit
11 basic feature value extraction processing unit
12 spectrum analysis feature value extraction unit
13 continuous wavelet transform processing unit
14 wavelet transform feature value processing unit
15 wavelet transform spectrum analysis feature value extraction processing unit
20 machine learning diagnosis unit
30 anomalous location estimation unit

The invention claimed is:

1. A method for vibroacoustic analysis implemented by at least one processor, the method comprising:
extracting feature values from time-series vibroacoustic data measured in equipment in operation;
accumulating feature values corresponding to a state in which the equipment operates normally and general measurement data on the equipment;
constructing through machine learning a probability distribution model using the feature values corresponding to the state in which the equipment operates normally and the general measurement data;
feeding the probability distribution model with the general measurement data on the equipment and with the feature values;
calculating a degree of anomaly based on the probability distribution model;
issuing an alarm if the degree of anomaly is not within a normal range;

pre-calculating a damaged-case dataset of degrees of anomaly for each location in the equipment that correspond to cases where the location is damaged;
comparing the damaged-case dataset with an actual measurement dataset of degrees of anomaly calculated from general measurement data on the equipment to obtain a degree of similarity for each location in the equipment;
outputting, on charts, the locations, in order ranked by the degrees of similarity for each location in the equipment, as locations having high likelihoods of being damaged, an abscissa of each of the charts representing a frequency level and an ordinate of each of the charts representing a degree of anomaly; and
implementing maintenance of the equipment based upon the locations having the high likelihoods of being damaged so as to prevent secondary damage of the equipment,
wherein the extracting includes:
extracting an effective value, a peak value, a largest peak difference, skewness, kurtosis, an average crest factor, and an absolute average amplitude as feature values from measured acceleration in the time-series vibroacoustic data measured in the equipment in operation;
performing spectral analysis on the time-series data to extract an order and a peak value of a maximum peak, an order and a peak value of a second peak, an order and a peak value of a third peak, an order and a peak value of a fourth peak, . . . and an order and a peak value of a n-th peak as the feature values for the data obtained;
performing a wavelet transform on the time-series data to decompose the time-series data into scale levels corresponding to a plurality of frequency bands and obtain power time-series data for each of the scale levels;
extracting an effective value WP1, a largest value WP2, a highest crest factor WP3, and an absolute average value WP4 as feature values for each of the frequency bands from the power time-series data obtained for each of the scale levels, wherein $WP1 = \sqrt{\Sigma_{i=1}^{n} x_i^2 / n}$, $WP2 = \max(x_i)$, $WP3 = WP2/WP1$, $WP4 = \Sigma_{i=1}^{n} |x_i - \bar{x}|/x$; and performing spectral analysis on the power time-series data obtained for each of the scale levels to extract an order and a peak value of a maximum peak, an order and a peak value of a second peak, an order and a peak value of a third peak, an order and a peak value of a fourth peak, . . . and an order and a peak value of an n-th peak as the feature values for the data obtained.

2. The method for vibroacoustic analysis as claimed in claim 1, wherein the general measurement data on the equipment includes at least one selected from a group consisting of rotation number, output, workload, pressure, temperature, and speed.

3. An apparatus for vibroacoustic analysis comprising:
at least one processor configured to:
extract feature values from time-series vibroacoustic data measured in equipment in operation;
accumulate feature values corresponding to a state in which the equipment operates normally and general measurement data on the equipment;
construct through machine learning a probability distribution model using the feature values corresponding to the state in which the equipment operates normally and the general measurement data;
feed the probability distribution model with the general measurement data on the equipment and with the feature values;
calculate a degree of anomaly based on the probability distribution model;
issue an alarm if the degree of anomaly is not within a normal range;
pre-calculate a damaged-case dataset of degrees of anomaly for each location in the equipment that correspond to cases where the location is damaged;
compare the damaged-case dataset with an actual measurement dataset of degrees of anomaly calculated from general measurement data on the equipment to obtain a degree of similarity for each location in the equipment; and
output, on charts, the locations, in order ranked by the degrees of similarity for each location in the equipment, as locations having high likelihoods of being damaged, an abscissa of each of the charts representing a frequency level and an ordinate of each of the charts representing a degree of anomaly
wherein maintenance of the equipment is implemented based upon the locations having the high likelihoods of being damaged so as to prevent secondary damage of the equipment, and
wherein the extracting includes:
extracting an effective value, a peak value, a largest peak difference, skewness, kurtosis, an average crest factor, and an absolute average amplitude as feature values from measured acceleration in the time-series vibroacoustic data measured in the equipment in operation;
performing spectral analysis on the time-series data to extract an order and a peak value of a maximum peak, an order and a peak value of a second peak, an order and a peak value of a third peak, an order and a peak value of a fourth peak, . . . and an order and a peak value of a n-th peak as feature values for the data obtained;
performing a wavelet transform on the time-series data to decompose the time-series data into scale levels corresponding to a plurality of frequency bands and obtain power time-series data for each of the scale levels;
extracting an effective value WP1, a largest value WP2, a highest crest factor WP3, and an absolute average value WP4 as feature values for each of the frequency bands from the power time-series data obtained for each of the scale levels, wherein $WP1 = \sqrt{\Sigma_{i=1}^{n} x_i^2 / n}$, $WP2 = \max(x_i)$, $WP3 = WP2/WP1$, $WP4 = \Sigma_{i=1}^{n} |x_i - \bar{x}|/x$; and performing spectral analysis on the power time-series data obtained for each of the scale levels to extract an order and a peak value of a maximum peak, an order and a peak value of a second peak, an order and a peak value of a third peak, an order and a peak value of a fourth peak, . . . and an order and a peak value of an n-th peak as feature values for the data obtained.

4. The apparatus for vibroacoustic analysis as claimed in claim 3, wherein the general measurement data on the equipment includes at least one selected from a group consisting of rotation number, output, workload, pressure, temperature, and speed.

* * * * *

UNITED STATES PATENT AND TRADEMARK OFFICE
CERTIFICATE OF CORRECTION

PATENT NO. : 12,228,475 B2
APPLICATION NO. : 17/480489
DATED : February 18, 2025
INVENTOR(S) : Takashi Fujii Page 1 of 1

It is certified that error appears in the above-identified patent and that said Letters Patent is hereby corrected as shown below:

In the Claims

Column 13, Line 50, change " $WP4=\Sigma_{i=1}^{n}|\chi_i-\overline{\chi}|/x$ " to -- $WP4=\Sigma_{i=1}^{n}|\chi_i-\overline{\chi}|/n$ --; and Column 14, Line 64, change " $WP4=\Sigma_{i=1}^{n}|\chi_i-\overline{\chi}|/x$ " to -- $WP4=\Sigma_{i=1}^{n}|\chi_i-\overline{\chi}|/n$ --.

Signed and Sealed this
Twenty-second Day of April, 2025

Coke Morgan Stewart
*Acting Director of the United States Patent and Trademark Office*